United States Patent [19]

Card et al.

[11] 4,412,670

[45] Nov. 1, 1983

[54] FAIL-SAFE ACTUATOR AND HYDRAULIC SYSTEM INCORPORATING THE SAME

[76] Inventors: Lorin P. Card, 16944 Plummer St., Sepulveda, Calif. 91343; Otto W. Borsting, 2204 Stanbridge Ave., Long Beach, Calif. 91342

[21] Appl. No.: 281,087

[22] Filed: Jul. 7, 1981

Related U.S. Application Data

[62] Division of Ser. No. 65,368, Aug. 9, 1979, Pat. No. 4,295,630.

[51] Int. Cl.[3] .................... F16K 31/00

[52] U.S. Cl. .................... 251/14; 60/403; 60/418; 91/459; 92/137; 251/27

[58] Field of Search .................... 60/418, 403, 432; 91/509, 431, 459; 251/14, 27; 92/137

[56] References Cited

U.S. PATENT DOCUMENTS

| | | | |
|---|---|---|---|
| 2,618,243 | 11/1952 | Tregonowan | 60/404 |
| 3,144,812 | 8/1964 | Rager et al. | 92/137 |
| 3,542,331 | 11/1970 | Conalizo | 251/14 |
| 3,801,062 | 4/1974 | Arn et al. | 251/14 |
| 3,839,945 | 10/1974 | Jacobellis | 92/121 |
| 3,863,446 | 2/1975 | Giwosky | 60/431 |
| 4,003,547 | 1/1977 | Snyder et al. | 92/137 |
| 4,085,587 | 4/1978 | Garlinghouse | 60/404 |

*Primary Examiner*—A. Michael Chambers
*Attorney, Agent, or Firm*—Arthur B. Colvin

[57] ABSTRACT

The present invention is directed to an improved fail-safe actuator and hydraulic system incorporating the same. The actuator includes energy storage means in the form of a spring adapted to set a control device in a predetermined condition, illustratively in the closed condition, responsive to a failure situation, illustratively, a power failure. The actuator includes a coupling which permits normal operation of the control device without cycling the spring energy storage means, thus increasing the life of the spring and eliminating energy wastage inherent in cocking the spring during each operative cycle.

2 Claims, 7 Drawing Figures

FAIL-SAFE ACTUATOR AND HYDRAULIC SYSTEM INCORPORATING THE SAME

This application is a division of copending application Ser. No. 065,368, filed Aug. 9, 1979 now U.S. Pat. No. 4,295,630 issued Oct. 20, 1981.

BACKGROUND OF THE INVENTION

1. Field of the Invention

The present invention is in the field of fail-safe actuator devices and systems incorporating the same and pertains more particularly to a fail-safe actuator for use in conjunction with a control device utilized in a hydraulic control system.

2. The Prior Art

As conducive to an understanding of the present invention, it may be noted that in certain installations and particularly in remote or unmanned installations, it is necessary that the condition of a control device such as a valve, be set to a certain sense in the event of a power failure or like happening. By way of example, in a remote automatic oil pump station, in the event a repture of the line is sensed, it is necessary that a valve be actuated to interrupt fluid flow in the oil line.

In fail-safe actuators heretofore known, and particularly in fail-safe actuators which control a valve and which utilize springs as the energy storing medium, the normal operation of the valve has also involved cycling of the spring of the actuator, i.e., illustratively when the valve is closed the tension of the spring is released and when the valve is opened by the actuator, tension is placed on the spring.

Such an actuator arrangement is shown in the U.S. Pat. No. 3,051,143 to Nee, which provides a hydraulically operated actuator having energy storage means in the form of a coil spring adapted to rotate the shaft of the actuator with drop of hydraulic pressure. Thus if said actuator is used to control a valve, upon drop in pressure to the actuator, the tensed spring will effect closure of the valve, for example. However the spring of Nee is cycled each time the actuator is energized.

As is well known, frequent cycling of a spring prematurely compromises the spring, requiring its frequent replacement to assure its effectiveness in the event of a sensed failure situation.

Also, systems as heretofore known which for normal operation require the hydraulic actuator not only shift the position of a valve but also to introduce energy into the fail-safe spring of the actuator, greater power is required than would normally be necessary to operate the valve alone, since the actuator mechanism must, in addition, compress the spring to its energy storing condition with each operating cycle of the actuator.

SUMMARY OF THE INVENTION

The present invention may be summarized as directed to a fail-safe actuator and hydraulic system incorporating a valve operatively connected to the actuator, characterized in that the fail-safe actuator employs an energy storage device such as a spring mechanism which, when once cocked by the application of fluid under pressure, is retained in the cocked position during normal operation of the valve and only when the fluid is released will the spring be operative to control the valve. The spring of the actuator need not be compressed or cocked during each cycle and the spring, when once cocked, remained in the cocked condition, avoiding recycling and consequent premature fatigue thereof.

In accordance with the invention, the fail-safe actuator comprises a casing having a port at one end and housing a piston mounting one end of a piston rod. The energy storage spring is biased between the piston and the other end of the casing. The other end of the piston rod projects beyond the other end of the casing and is operatively connected to the apparatus to be controlled, by a flexible cable member arrayed over an arcuate surface of yoke fixed to the control shaft of the fail-safe actuator which shaft is operatively connected to the shaft of a control device or valve.

In an illustrative embodiment of the invention, the control shaft is axially coupled to the shaft of a hydraulic rotary actuator assembly, illustratively in the form shown and described in U.S. Pat. No. 3,839,945, and the shaft of said rotary actuator is axially coupled to the shaft of the valve illustratively of the rotary type. The cable is so connected that in normal operation of the system it will be in tensioned condition over the surface of the yoke in one limiting position of the valve and in slackened condition when the valve is moved from the one to a second limiting condition. The cable thus does not interfere with the normal operation of the valve by the rotary actuator.

When the fail-safe actuator senses a failure in the system the cocked spring is released and the cable is drawn by the piston rod in such manner as to cause rotation of the yoke and control shaft to which it is attached, thereby moving the shaft of the rotary actuator and the shaft of the valve to the failure position.

Accordingly, it is an object of the invention to provide an improved actuator device to be used as a fail-safe member in a hydraulic system or the like.

A further object of the invention is the provision of an energy storing fail-safe actuator device which will permit independent cycling of the apparatus which it controls without cycling of the energy storage spring of the actuator device, whereby the energy required for normal operation of the controlled apparatus is not materially increased by the presence of the fail-safe actuator.

A further object of the invention is the provision of a fail-safe mechanism of the type described wherein cycling of the spring energy storing means during normal operation of the valve or like control assembly is avoided, thus greatly increasing the effective life of the spring assembly.

To attain these objects and such further objects as may appear herein or be hereinafter pointed out, reference is made to the accompanying drawings, forming a part hereof, in which.

Figure 1:
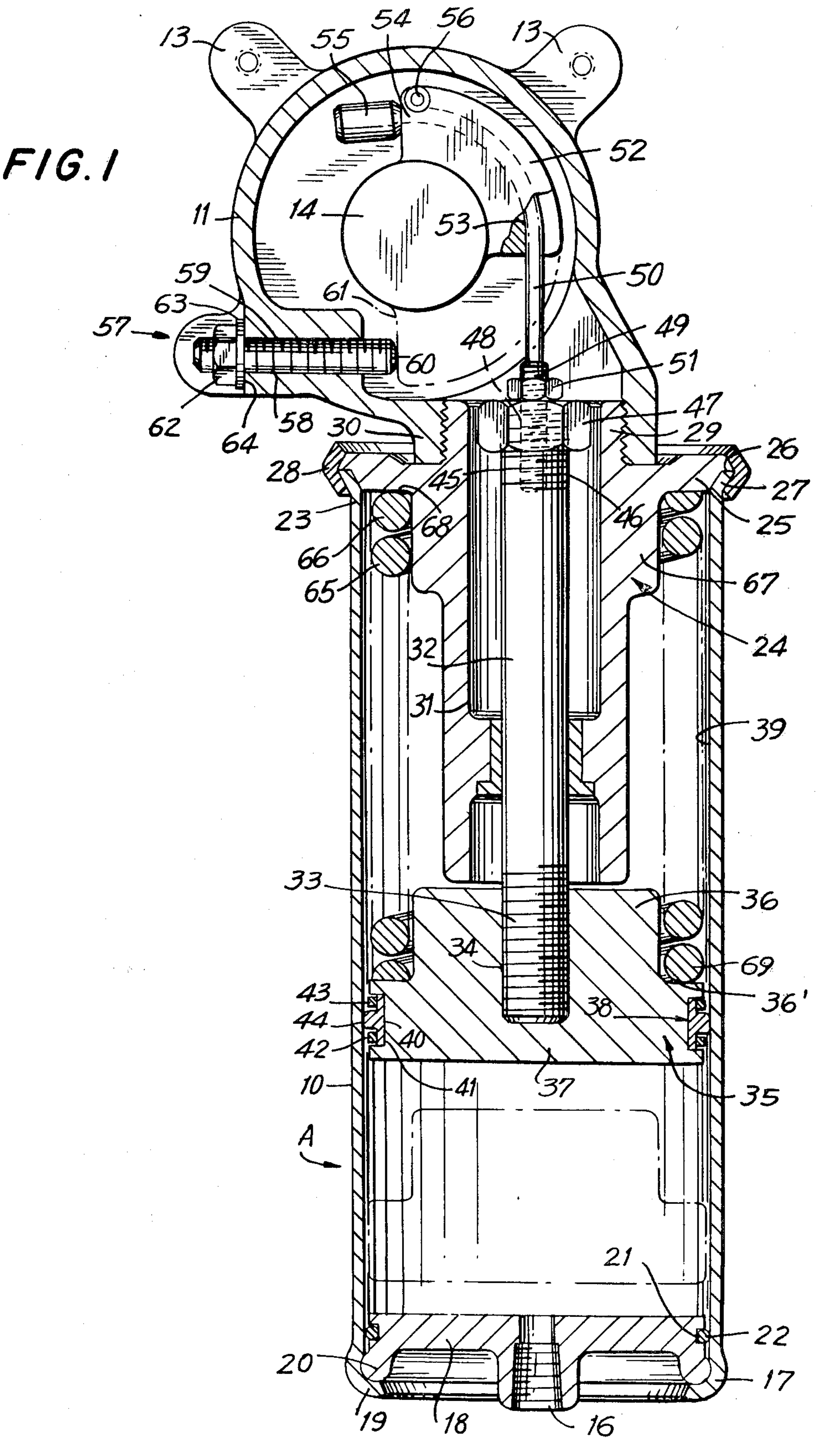
FIG. 1 is a longitudinal sectional view through a fail-safe actuator device in accordance with the invention.

Referring now to the drawings, there is disclosed in FIG. 1 a fail-safe actuator device A comprising an elongate casing 10, cylindrical in transverse section, to which is fixed a housing 11. The housing 11 may comprise a tubular fixture having its axis perpendicular to the axis of casing 10 and having mounting feet 13 illustratively formed integral therewith and having an operating shaft 14 journalled for rotation therein.

The casing 10 includes a flow port 16 at one end 17 thereof. Preferably the flow port 16 is formed in a disk-shaped end plate 18, which is fixed in position as by roll forming an annular lip portion 19 of the casing over an annular proturbance 20 of the end plate 18. The end plate 18 includes a radially outwardly directed circumferential groove 21 carrying O-ring 22, whereby the disk 18 is securely retained in the end 17 of the casing in a leak-free sealing relation with respect thereto.

The other end 23 of the casing 10, supports a closure plug assembly 24. The plug assembly includes an enlarged annular flange 25 having a forwardly facing shoulder 26 maintained in abutting relationship against the end edge 27 of the casing by locking disk 28 which may be spun over the flange 25 and the outwardly flared end portion 23 of the casing securely to retain the plug assembly 24 in co-axial alignment within the casing. The plug assembly 24 includes an externally threaded reduced neck portion 29 projecting beyond the casing. The housing 11 is secured to the neck 29 by engagement of internally threaded integral collar 30 with the threading of the neck portion 29.

The plug assembly is provided with an integral axially directed bore 31, within which is slidably guided piston rod member 32. The distal end 33 of the piston rod member is threadedly connected as at 34 with the piston 35 next to be described.

The piston 35 includes a reduced diameter trailing portion 36 defining an annular shoulder 36'. The forwardmost or enlarged head 37 of the piston carries a packing or gasketting arrangement 38 slidably engaging and defining a tight seal with the internal bore 39 of the casing 10. The gasketting or seal arrangement 38 may include a seal section 40 which is generally T-shaped in transverse section, the seal arrangement being mounted within a radially outwardly directed peripheral groove 41 in the enlarged head protion 37 of the piston. A pair of annular spring retainer rings 42, 43 are mounted over the seal section 40 forwardly and rearwardly of the projecting sealer portion 44 thereof, whereby the seal 40 is retained in position within the groove 41.

The rearwardmost end 45 of the piston rod is externally threaded as at 46 for the mounting of a stop and adjustment nut 47. In addition, said end 45 of the piston rod includes an internally tapped bore 48. The bore provides an anchor or attachment means for threaded insert member 49 fixed to one end of a flexible cable 50. The insert member 49 is threadedly engaged within the tapped bore 48. A cable lock nut 51 is threaded over the extending portion of the insert 49 and tightened against the rearmost surface of the nut 47, whereby the depthwise adjustment of the insert 49 relative to the rod 32 may be accurately established.

From the foregoing description it will be preceived that a degree of adjustment of the amount of cable extending beyond the end of the piston rod may be varied by modifying the threaded relationship of the nuts 47 and 51 and the depthwise threading of the insert 49 into the rod member 32.

The shaft 14 has secured thereto a yoke 52 which illustratively comprises 90° of arc, the yoke including a recessed, radially outwardly open track 53. The cable is arrayed over the arcuate track 53, the distal end 54 of the cable having an enlarged stop clamp 55 mounted thereover. A retainer pin 56 is extended transversely through the yoke, adjacent the stop clamp 55 and outwardly of cable 50 assuring that the cable is ratained to the yoke.

An adjustment assembly 57 is provided for accurately establishing the rotary position of the yoke 52 which is keyed to the shaft 14. The adjustment assembly 57 may include a set screw member 58 mounted within a complementally threaded bore 59 formed in the housing 11. The set screw member includes a stop end portion 60 disposed in the path of stop shoulder 61 formed on the yoke.

The set screw 58 is locked in position by a lock nut 62 threaded over the set screw, a lock washer 63 preferably being interposed between the nut 62 and the flat stop shoulder 64 formed on the housing.

It will be understood that by inwardly or outwardly threading of the set screw 58, the degree of clockwise rotation capable of being imparted to the yoke 52 will be controlled.

A energy storing device in the form of a coil spring 65 is mounted within the casing 10. The spring 65 has an outer end portion 66 surrounding spring retainer neck 67 of the plug assembly 24, said portion 66 being biased against shoulder 68 of the plug assembly. The innermost end 69 of the spring 65 is biased against rearwardly facing annular shoulder 36' formed on the piston. The piston assembly, comprised of the piston rod 32 and piston 35, are axially moveable within the casing 10 between limiting positions shown in FIG. 1, namely, the solid line energy storing or cocked position of the spring and the dot and dash energy releasing or uncocked position of the spring.

It will be understood from the foregoing that the fail-safe actuator assembly described is intended to provide motive power for moving a control device such as the shaft of a ball valve or the like, from an open to a closed position, for example, in the event of a failure in the system controlled by the valve, which failure is detected by a suitable sensor 70 which may be pressure actuated or actuated by a power failure, as is well known.

Figure 4:
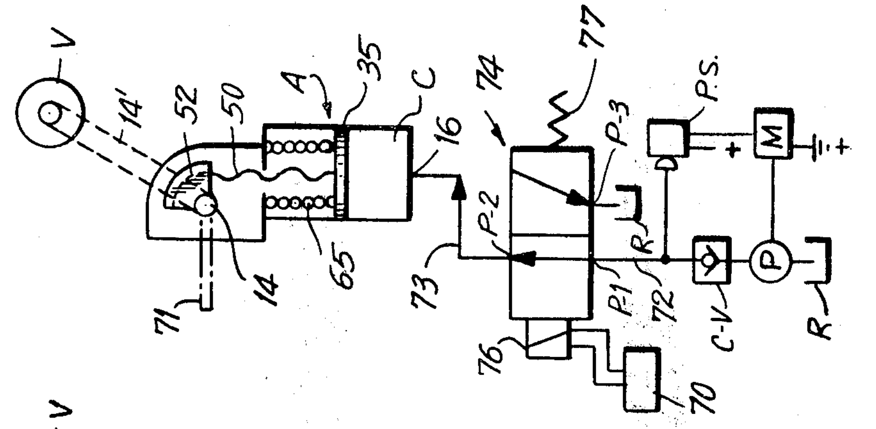
FIGS. 2, 3 and 4 are diagrammatic views of a manually controlled valve incorporating a fail-safe actuator device in accordance with one embodiment of the invention.
Figure 3:
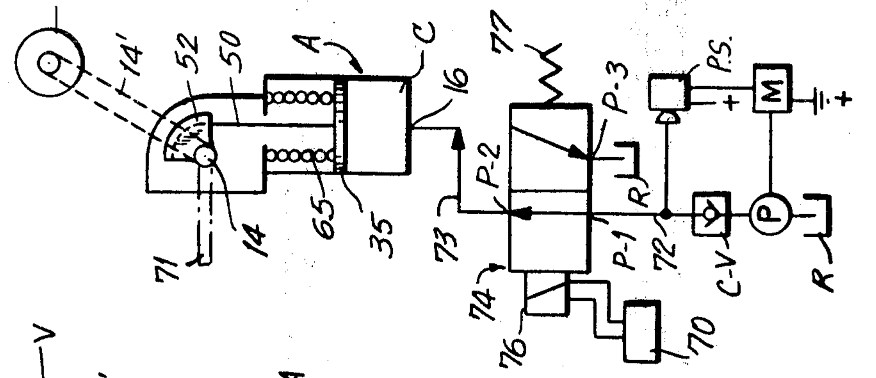
Figure 2:
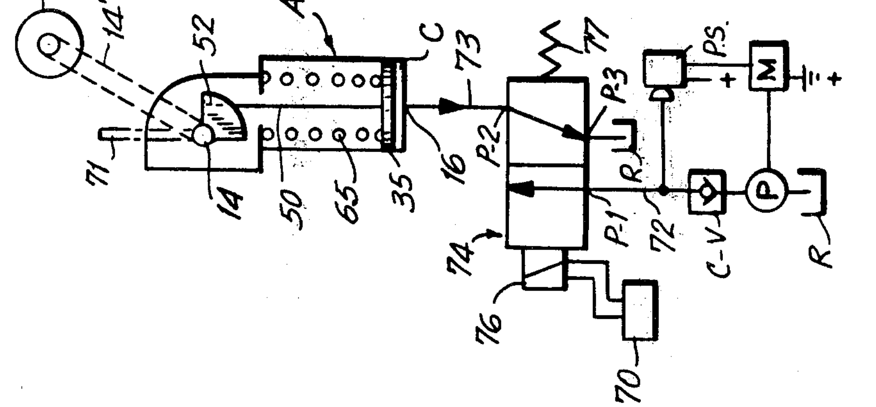

Referring now to FIGS. 2, 3 and 4 wherein a basic form of incorporation or utilization of the fail-safe actuator assembly A, shown in FIG. 1, is illustrated diagrammatically, the shaft 14 of the actuator assembly is attached to the shaft 14', of a manually actuated ball valve V. In FIG. 3 the shaft 14' has been manually rotated by handle 71 such that the valve V is illustratively in the open position.

As a result of such manual rotation of shaft 14', the shaft 14 of the fail-safe actuator and the yoke 52 carried thereby will also be rotated in a counterclockwise direction to the position shown in solid lines in FIG. 1 and in FIG. 3. Such rotation of yoke 52 will apply tension to cable 50 causing the piston 35 to be moved upwardly referring to FIG. 1 and upwardly referring to FIG. 3, thereby compressing or cocking the coil spring 65.

At the same time as handle 71 is rotated in a counterclockwise direction through an arc of say 90° to move the valve V to open position and cock the coil spring 65, as shown in FIG. 3, the pilot valve 74 is actuated by energizing its coil 76 through the sensor 70. As a result, the pressure inlet port P-1 and pressure outlet port P-2 of pilot valve 74 will be connected, so that fluid under pressure may flow from pump P through the associated one-way check valve CV and conduits 72 and 73 into port 16 of the fail-safe actuator to react against piston 35 to retain the latter in its upper-most position in which the coil spring 65 is cocked.

By reason of one-way check valve CV, once chamber C is charged with fluid, and so long as the coil 76 of the pilot valve 74 is energized to connect ports P-1 and P-2 and retain discharge port P-3 closed, no fluid can discharge from port 16 and the piston 35 will retain the spring 65 in the cocked position.

When the spring 65 has been fully cocked the pressure in line 72 will have reached a value to operate pressure switch PS to open the circuit to motor M driving pump P, to stop said pump.

The valve V may be manually moved to closed position by rotating handle 71 in a clockwise direction from the position shown in FIG. 3 to the position shown in FIG. 4. This will cause the shaft 14' and the shaft 14 of the fail-safe actuator connected thereto to rotate in a clockwise direction and also rotate the yoke 52 in the same direction.

In the course of such movement the connecting cable 50 will merely develop a degree of slack (FIG. 4) and thus the cable will not interfere with the normal manual operation of the valve shaft 14' by handle 71. Additionally the spring 65 will be retained in its cocked position during manual movement of the valve V so long as fluid has not been released from chamber C of casing 10, of actuator A. Thus manual operation of the valve V by handle 71 does not require compression and release of the spring 65 after the initial cocking of the spring 65.

Assuming that the valve V is in open position as shown in FIG. 3, and that there is a failure in the system, which causes operation of sensor 70, thereby resulting in an interruption of current flow to the solenoid coil 76, the spring 77 of the pilot valve 74 will be effective to shift the movable member of the pilot valve 74 to the position indicated in FIG. 2, whereupon the port P-1 is closed and the port P-2 is connected to discharge port P-3 which is connected to a reservoir R. Connection of the conduit 73 through ports P-2 and P-3 to the reservoir R, will enable the fluid in the chamber C of actuator A to be discharged through port 16 by the force of the compressed spring 65 reacting against the piston 35. This will cause the piston rod 32 to be shifted toward the end plate 18 (FIG. 1). The noted movement of the piston rod will cause a concomitant movement of the cable 50 wrapped around the arcuate track 53 of the yoke 52, whereby the yoke will be rotated by the expanding energy of the spring thereby rotating the shaft 14' through a 90° rotation from the position shown in FIG. 3 to the position shown in FIG. 2 and changing the sense of the valve V connected to the shaft 14', e.g. from an opened to a closed condition. Since operation of the sensor results for example from a failure of power in the system the motor M will not be energized to drive pump P.

Figure 7:
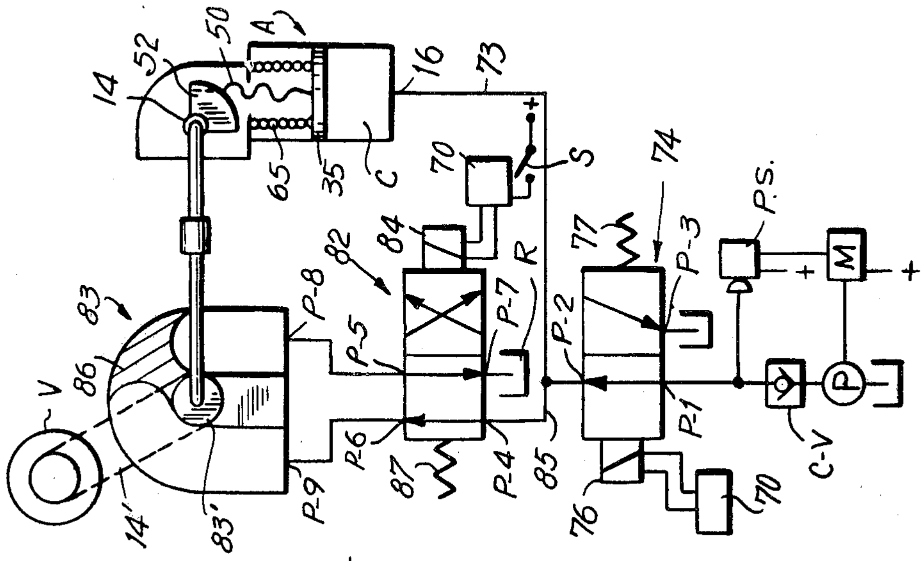
FIGS. 5, 6 and 7 are diagrammatic views of a hydraulic control system utilizing the fail-safe actuator device in accordance with another embodiment of the invention.
Figure 6:
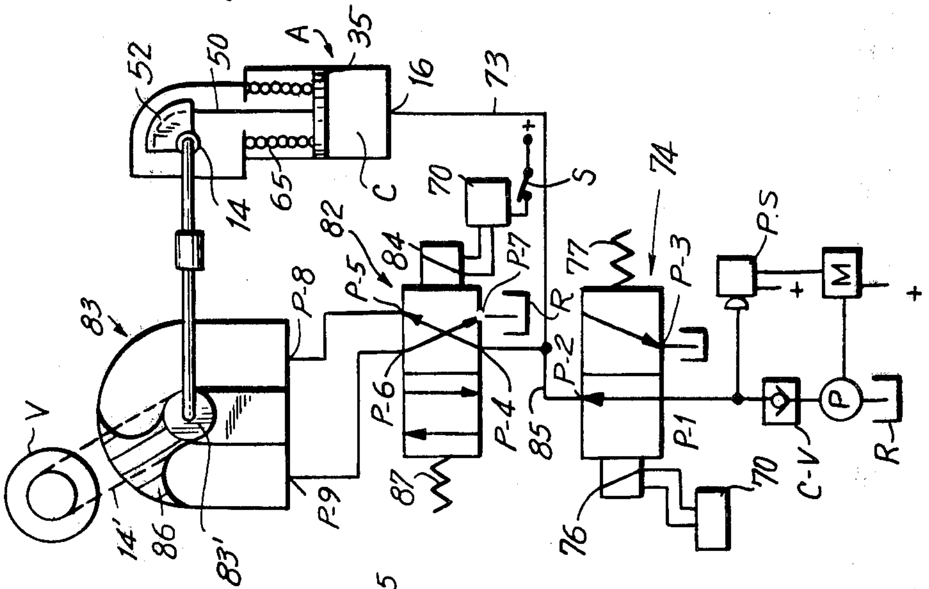
Figure 5:
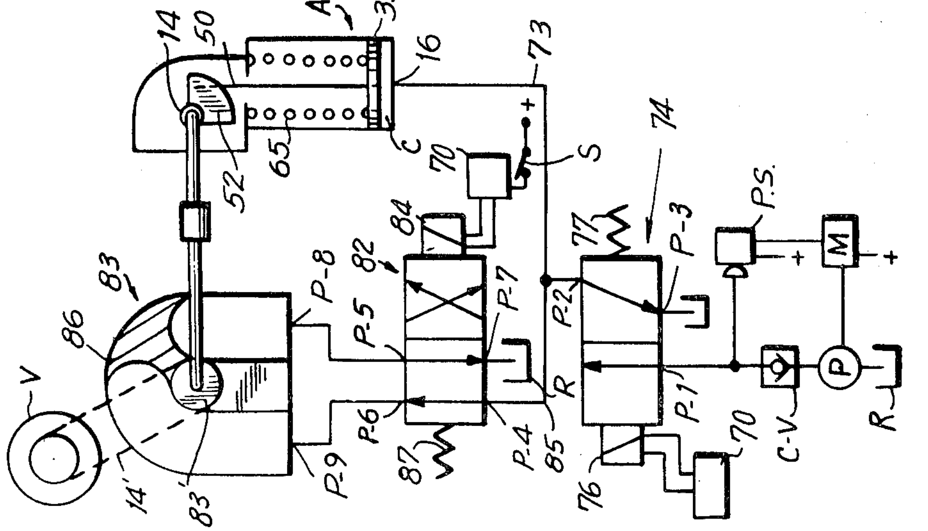

In FIGS. 5 to 7 the fail-safe actuator A is used in conjunction with a hydraulically operated rotary actuator 83 of the type described in U.S. Pat. No. 3,839,945, interposed between the fail-safe actuator A and valve V for remote operation of the valve V by the energization and deenergization of coil 84 of control valve 82 associated with the rotary actuator 83.

In addition a pilot valve 74 is associated with the fail-safe actuator A, the coil 76 of the valve being controlled by sensor 70.

Assuming that it is desired in normal operation of the system to move valve V from the closed position shown in FIG. 7, to the open position shown in FIG. 6, as shown in FIG. 6, the coil 84 of control valve 82 is energized through a switch S and sensor 70 to connect its ports P-4, P-5 and P-6 P-7 and coil 76, pilot valve 74 is energized by the normal operation of the sensor 70 to connect its ports P1 and P2.

Consequently fluid under pressure will flow from pump P through one-way check valve CV, through ports P-1, P-2 of valve 74 conduit 85 through ports P-4, P-5 of control valve 82 to port P-8 of the rotary actuator 83 and from port P-9 of actuator 83 through ports P-6 and P-7 of valve 82 to discharge into a reservoir. In addition, fluid under pressure will flow through conduit 73 to port 16 of fail-safe actuator A.

In the manner described in said U.S. Pat. No. 3,839,945 the vane 86 of actuator 83 will be rotated in counter clockwise direction from the position shown in FIG. 7 to the position shown in FIG. 6 and the shaft 83' thereof which will also be rotated in such direction will rotate the shaft 14 of the fail-safe actuator A and shaft 14' of valve V in the same direction to move valve V to open position.

The fluid under pressure from the pump flowing through conduit 73 to port 16 of fail-safe actuator A will fill chamber C and react against piston 35. The piston 35 will have been moved upwardly (FIG. 6) to compress spring 65 by the tension on cable 50 due to rotation of shaft 14 and such piston will be retained in its uppermost position (FIGS. 1 and 6) to retain spring 65 in cocked condition so long as chamber C is charged with fluid.

When it is desired to close valve V, in normal operation of the system, the coil 84 of control valve 82 is deenergized by opening switch S (FIG. 7) and the spring 87 controlling the valve 82 will move the movable member thereof to connect ports P-4 and P-6 as well as Ports P-5 and P-7. Since the coil 76 of pilot valve 74 remains energized through sensor 70, the fluid under pressure from pump P will flow through ports P-1, P-2, to conduit 85 and through ports P-4, P-6 into port P-9 of rotary actuator 83 to move the vane 86 thereof to the closed valve position shown in FIG. 7.

At the same time rotation of shaft 83' of actuator 83 will rotate shafts 14' and 14 to move valve V to closed position and rotate yoke 52 in a clockwise direction from the position shown in FIG. 6. Since the piston 35 is still maintained in its uppermost position due to the fluid in chamber C, the spring 65 will remain cocked and slack will develop in cable 50 as shown in FIG. 7.

Thus by energizing and deenergizing the coil 84 of control valve 82, the rotary actuator 83 may be operated to open and close the valve V from a remote position through switch S and so long as the system is operating properly, the spring 65 of the fail-safe actuator will remain in cocked condition.

In the event of a failure in the system which requires automatic closing of valve V, from its open position shown in FIG. 6, both the coils 84 and 76 of the control valve 82 and pilot valve 74 are deenergized automatically due to the action of sensor 70 which detects such failure. Thus the springs 87 and 77 associated with said valves 82 and 74 respectively will move them to the positions shown in FIG. 5 in which ports P-4, P-6 and P-5, P-7 of control valve 82 are connected and ports P-2, P-3 of valve 74 are connected.

As a result, the fluid in the rotary actuator 83 can be discharged through port P-8 thereof and through ports P-5, P-7 of control valve 82 to reservoir R, so that the shaft 83' of actuator 83 is free to rotate.

At the same time, since the port 16 of fail-safe actuator A is now connected through ports P-2, P-3 of pilot valve 74 to reservoir R, the spring 65 thereof is free to expand to the position shown in FIG. 5 forcing the piston 35 downwardly so that the fluid in chamber C will flow out of Port 16.

Consequently the tension applied to cable 50 will cause the yoke 52 and shaft 14 to rotate in a clockwise direction from the position shown in FIG. 6 to the position shown in FIG. 5, thereby similarly rotating shaft 83' and valve shaft 14' automatically to close the valve V.

From the foregoing description it will be evident that there is disclosed herein a fail-safe actuator and system incorporating said actuator including a spring member as an energy storing means, which fail-safe actuator has the advantage of permitting the system to be operated without cycling the spring. The ability to actuate the system through normal operating cycles without affecting the position of the spring reduces the amount of energy required for normal operation since the force of the spring need not be overcome, and also increases the duty cycle of the spring by eliminating metal fatigue which accompanies cycling and recycling of the spring, as required in fail-safe systems heretofore known.

It will be evident to those skilled in the art, in the light of the instant disclosure, that variations may be made in the disclosed embodiments without departing from the spirit of the invention. Accordingly, the invention is to be broadly construed within the scope of the appended claims.

The embodiments of the invention in which an exclusive property or privilege is claimed are defined as follows:

1. A fail-safe valve operating assembly including a valve member having a shaft, a hydraulic rotary vane actuator member having drive shaft means operatively connected to said shaft of said valve member for shifting the position of said shaft of said valve member and hence said valve responsive to the rotated position of said actuator member, a fail-safe actuator member operatively connected to said drive shaft means and said shaft of said valve member for shifting the positions of said shaft means and shaft, said actuator member including a casing having a cylindrical bore formed therein and having a port at one end thereof, a piston mounted for reciprocal movement within said bore between extended and retracted positions and defining with said bore a variable volume pressure chamber, spring means in said casing biased between said piston and the other end of said casing for urging said piston to said extended position whereat said piston lies adjacent said port end of said chamber, a housing on said casing, a drive shaft journaled in said housing for rotation about an axis normal the axis of said bore, a quadrant shaped yoke member mounted on said drive shaft, and including an outwardly open peripherial guide track coaxially arranged with respect to said drive shaft, a flexible cable having one end operatively connected to said piston, said cable being disposed in said guide track of said yoke member, the other end of said cable being operatively connected to said yoke member at a position to induce rotation of said drive shaft responsive to movement of said piston from said retracted to said extended condition, said cable, in said retracted condition of said piston being in slack condition whereby said drive shaft means and said shaft of said valve may be freely rotated without interference from said cable, movement of said piston from said retracted to said extended condition being effective to rotate said drive shaft and hence shift the position of said drive shaft means and said shaft of said valve member, means for introducing fluid under pressure of said port of said fail-safe actuator to shift said piston from said extended to said retracted position against the force of said spring means, and pilot valve means operatively connected to said port for venting said port responsive to a sensed failure condition to thus cause said piston to shift from said retracted to said extended condition under the force of said spring means, said rotary actuator further including a movable vane connected to the shaft thereof, said actuator having two control ports, a control valve having two operating positions and having a pressure inlet port and a discharge port as well as two operating ports connected to the control ports of said rotary actuatory, means connecting the outlet port of said pilot valve to the pressure inlet port of said control valve, and means in one operating position of said control valve to connect one of said operating port to the discharge port and, in a second operating position, to connect said first operating port to said discharge port and the other operating port to the pressure inlet port.

2. Apparatus in accordance with claim 1 where in said pilot valve means includes a pilot valve shiftable between two operating positions, said pilot valve having a pressure port adapted to be connected to a source of fluid under pressure, an outlet port connected to said portion of said fail-safe actuator, and a discharge port, means in one operating position of said valve to connect said pressure port to said outlet port to effect movement of said piston from said extended to said retracted position and to close said discharge port, and means in the other operating position of said pilot valve to close said pressure port and connect said port of said fail-safe member to said discharge port to permit movement of said piston to said extended position.

* * * * *